Dec. 18, 1923.
H. G. DALZELL
1,478,026
COMPOSITE GLASS DISH
Filed Jan. 10, 1923
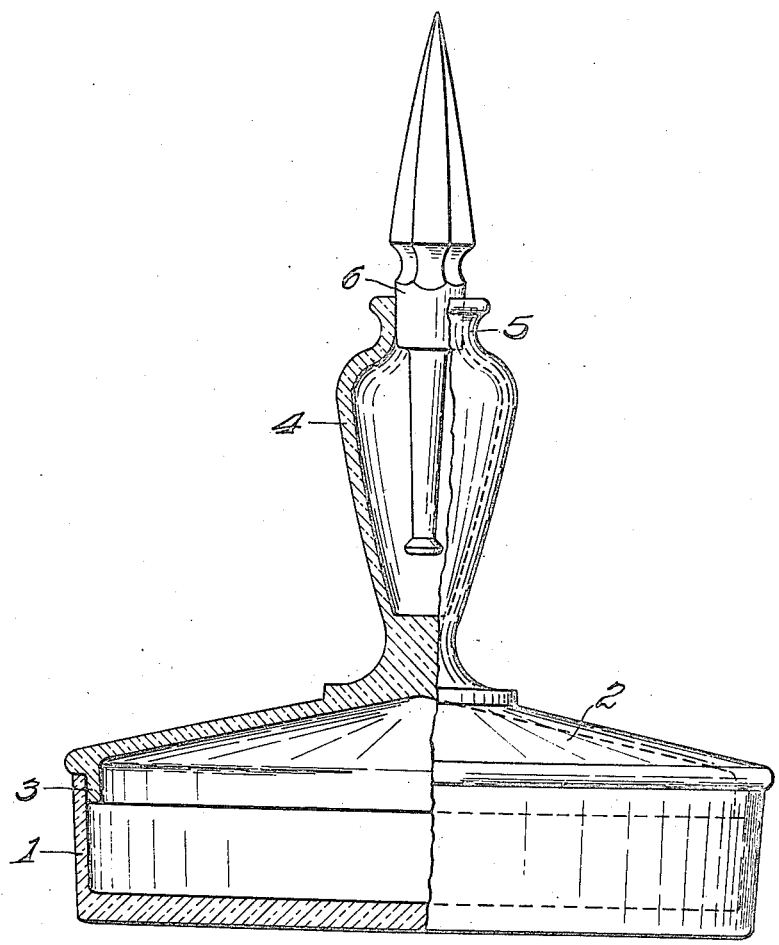
INVENTOR
Harry G. Dalzell.
By H. E. Dunlap
ATTORNEY Patented Dec. 18, 1923.

1,478,026

UNITED STATES PATENT OFFICE.

HARRY G. DALZELL, OF CHICAGO, ILLINOIS, ASSIGNOR TO FOSTORIA GLASS COMPANY, OF MOUNDSVILLE, WEST VIRGINIA, A CORPORATION OF WEST VIRGINIA.

COMPOSITE GLASS DISH.

Application filed January 10, 1923. Serial No. 611,707.

*To all whom it may concern:*

Be it known that I, HARRY G. DALZELL, a citizen of the United States of America, and resident of Chicago, county of Cook, and State of Illinois, have invented certain new and useful Improvements in Composite Glass Dishes, of which the following is a specification.

This invention relates broadly to articles of glassware or ceramic ware, and more specifically to a composite bottle and bowl structure.

The primary object of the invention is to provide a bowl-like covered receptacle or container for powder puffs or other toilet articles or accessories, having superposed thereon a bottle-like container for liquid perfumes, toilet waters, or the like.

A further object is to provide in a novel, convenient and ornamental form a composite two-compartment article adapted for use on ladies' dressing tables, which serves as a container both for liquid and non-liquid toilet accessories.

In describing the invention in detail, reference is herein had to the accompanying drawing, in which—

The figure is a view of the invention partly in side elevation and partly in central vertical section.

Referring to said drawing, 1 indicates a dish or bowl, preferably of shallow, flat shape and herein shown as circular in form. Removably seated upon said bowl is a cover 2, preferably of low form, having a depending annular flange 3 designed to fit more or less closely within the open top of the bowl, as shown.

Formed integral with the cover 2 is a centrally disposed upright member 4 of hollow bottle form designed as a container for toilet waters or liquid perfumes, the same having a contracted neck 5 within which is mounted a suitable stopper 6. Said bottle serves not only as a container, but also as a handle or knob which may be conveniently grasped for lifting the cover 2.

The bowl 1 may obviously be employed as a container for various articles, but it is primarily designed as a receptacle for powder boxes, powder puffs, and the like.

The cover 2 constitutes a substantial base for the bottle, the same being of such relatively large size that chance overturning of the bottle, either when said cover is mounted on the bowl or when seated upon a flat surface, is not likely to occur.

What is claimed is—

1. A dressing table accessory comprising a bowl, a cover removably mounted upon said bowl, and a bottle formed integral with and occupying a central upstanding position on said cover.

2. A dressing table accessory comprising a bowl, a cover removably mounted upon said bowl, and an upstanding centrally located handle-like member formed integral with said cover, said member being of hollow bottle form and constituting a container for liquid.

3. A dressing table accessory comprising a bowl, a cover removably mounted upon said bowl, and a bottle formed integral with and occupying a central upright position on said cover, said cover constituting a relatively large supporting base for the bottle when the latter occupies either mounted or unmounted relation to the bowl, and said bottle serving as a handle whereby the cover is grasped for lifting.

In testimony whereof I affix my signature in presence of two subscribing witnesses.

HARRY G. DALZELL.

Witnesses:
 CHAS. K. PRICE,
 RUTH E. WRIGHT.